US010945306B2

(12) United States Patent
Urban et al.

(10) Patent No.: US 10,945,306 B2
(45) Date of Patent: Mar. 9, 2021

(54) WIRELESS DEVICE POWERED BY A CITY DEVICE AND A METHOD OF PROVIDING WIRELESS CELLULAR AND INTERNET SERVICES

(71) Applicants: Daniel Urban, Driftwood, TX (US); Angelo J. Pino, Jr., New York, NY (US); Phillip Gennarelli, Cedar Park, TX (US); Benny E. Jay, Austin, TX (US)

(72) Inventors: Daniel Urban, Driftwood, TX (US); Angelo J. Pino, Jr., New York, NY (US); Phillip Gennarelli, Cedar Park, TX (US); Benny E. Jay, Austin, TX (US)

(*) Notice: Subject to any disclaimer, the term of this patent is extended or adjusted under 35 U.S.C. 154(b) by 82 days.

(21) Appl. No.: 16/562,966

(22) Filed: Sep. 6, 2019

(65) Prior Publication Data

US 2020/0084831 A1 Mar. 12, 2020

Related U.S. Application Data

(60) Provisional application No. 62/728,276, filed on Sep. 7, 2018, provisional application No. 62/834,514, filed on Apr. 16, 2019.

(51) Int. Cl.
*H02J 7/00* (2006.01)
*H04W 84/04* (2009.01)
*H04W 84/18* (2009.01)
*H02J 9/06* (2006.01)
*H01Q 1/24* (2006.01)
*G08G 1/017* (2006.01)
*H01Q 1/22* (2006.01)

(52) U.S. Cl.
CPC ........ *H04W 84/045* (2013.01); *G08G 1/0175* (2013.01); *H01Q 1/225* (2013.01); *H01Q 1/24* (2013.01); *H02J 9/061* (2013.01); *H04W 84/18* (2013.01)

(58) Field of Classification Search
None
See application file for complete search history.

(56) References Cited

U.S. PATENT DOCUMENTS

| 2006/0214630 | A1* | 9/2006 | Huang | H02J 7/0045 320/112 |
| 2011/0014501 | A1* | 1/2011 | Scheucher | B60L 58/18 429/7 |
| 2011/0311226 | A1* | 12/2011 | Smith | G02B 6/483 398/45 |
| 2015/0295440 | A1* | 10/2015 | Liao | H02J 7/0027 320/103 |
| 2016/0278147 | A1* | 9/2016 | Adrangi | H04W 12/04 |
| 2017/0347433 | A1* | 11/2017 | Sierla | H05B 45/10 |
| 2018/0106015 | A1  | 4/2018 | Pino | |

(Continued)

*Primary Examiner* — Brandon M Renner
(74) *Attorney, Agent, or Firm* — Jeffrey S. Melcher; Melcher Patent Law PLLC (57) ABSTRACT

A cell and/or internet device that can be connected to existing city devices that are powered by city power to install a wireless cell and/or internet service to the city. The system has a plurality of the cell and/or internet devices connected to associated city devices powered by city power, and the cell and/or internet devices are controlled by a server. A method of using the system to provide cell and/or internet services to a city.

19 Claims, 8 Drawing Sheets

(56) References Cited

U.S. PATENT DOCUMENTS

| | | | |
|---|---|---|---|
| 2018/0138945 A1* | 5/2018 | Kearney | ............. H04L 25/4902 |
| 2018/0156357 A1 | 6/2018 | Pino | |
| 2018/0205325 A1* | 7/2018 | Bian | ....................... F27D 21/04 |
| 2018/0233046 A1* | 8/2018 | Kim | ..................... G08B 25/016 |
| 2018/0292027 A1 | 11/2018 | Pino | |
| 2019/0086002 A1 | 3/2019 | Pino | |
| 2019/0226603 A1 | 7/2019 | Pino | |
| 2019/0267675 A1* | 8/2019 | Le | ....................... H01M 10/121 |

* cited by examiner

WIRELESS DEVICE POWERED BY A CITY DEVICE AND A METHOD OF PROVIDING WIRELESS CELLULAR AND INTERNET SERVICES

This application claims priority to U.S. provisional patent application Ser. Nos. 62/728,276, filed 7 Sep. 2018, and 62/834,514, filed 16 Apr. 2019, the complete disclosures of which are incorporated herein by reference.

FIELD OF THE INVENTION

The invention relates to a wireless cellular and/or internet device powered by a city device and method of providing wireless cellar and internet services to a city.

BACKGROUND OF THE INVENTION

The small cellular telephone (cell) and internet of things (IOT) is coming to many of the major cities within the United States. Some of this initiative is to support the 5G program and others are allowing technology devices to be placed onto city streets to assist with faster internet capabilities and other advances. Each of these devices will require power in order to operate and in many cases fiber optic cable is also required. This process helps provide for the quick access of power and reduces the cost of getting the power to the IOT or small cell devices.

To date, municipalities and power companies are requiring a new electrical service to power the small cell or IOT device. Conventional processes allow for very high costs to install new electrical service to support the small cell or IOT device. Building a new power service in many cases is not necessary as these devices are already being placed in an environment that already has power in place to support the city infrastructure such as street lights, parking meters, traffic signals and other municipal owned devices. This infrastructure was built many years ago and did not have the lower power demand that today's light emitting diode (LED) lights and other lower power devices have.

In many cases these lighting systems were built to support a minimum of a 1200 W light and sized for 5-6 1200 W lights per circuit. The current technology included in LED Lights requires only approximately 200 W of power. Therefore, the overage that exists in each circuit is approximately 1000 W of excess power per light on each circuit. The lighting systems are now oversized to support the current power demands of the lighting system. In the event an existing lighting system has not been retrofit for LED or a lower power demand light, using the present invention the older light could be replaced with an LED light or other lower power source to support the power buildout with excess power supplied to the lighting systems, traffic lights and/or city lights.

SUMMARY OF THE INVENTION

An object of the invention is to provide a cost effective solution to providing wireless cellular telephone (cell) and/or internet services to a city using city power efficiently and without the need to provide additional power infrastructure.

The present invention performs the calculations necessary and would allow for the IOT and small cell to utilize the existing electrical facilities and take advantage of the excess capacity by using increased efficiency devices, such as LED lights.

The present invention also allows the use of city power when the city device is not being powered, such as street lights during the daylight.

The present invention allows for a Battery Energy Storage System (BESS) to be connected to the existing lighting system or other powered city devices to create backup power. The BESS would allow additional energy to be stored so that when the city device, such as lighting becomes operational at night, there would be sufficient power in place to power the city device by the city power and an at least partially power the IOT or small cell device (wireless device) by the BESS in the event the lighting demand required more power than the circuit would allow for.

Current street lighting systems are designed to operate at night and are generally controlled by a photocell, timer or switch. The lighting systems generally do not operate during sunlight hours when the natural light is sufficient. By connecting a BESS to the street light, the BESS could be charged using the energy that is not being used by the lights during the day. Utilizing a BESS cabinet around the base of the pole or in an underground vault or cabinet tied to the pole, would not only benefit the small cell or IOT provider by reducing the cost of installing the power service it would also benefit the city and power company as well. This process would allow for the city power company to have the opportunity for free or reduced power costs for the lighting costs as well as standby power in the event of a power outage. The BESS would not only be capable of powering the IOT or small cell device in the event of an outage it would also be able to provide power for the light itself. This process would also increase public safety in the event of a power outage as the IOT and small cell communications would remain operational in addition it gives the municipality or energy provider the capability of also having the light operational in a power outage.

Another potential benefit of using the existing infrastructure and adding a BESS cabinet or underground vault to the lighting circuit is to assist the electrical provider in lowering their energy costs. The batteries could be fully charged in an off-peak time and then could be discharged back into the power system during peak times to lower the costs of energy as peak energy costs more than off peak energy.

The present invention allows for the following unexpected advantages for the municipality, power provider and IOT or small cell provider:
1. Reduced Construction Impact as new electric service does not have to be run as far because we would use the existing electrical system powering the lights.
2. Faster Construction Schedule as there is less work required and most of the electrical system is in place already
3. Reduced Cost for Construction
4. Reduced Energy Costs for city or power company providing lights
5. Standby power for wireless customer and city device by the BESS
6. Reduced Peak Energy Costs for Power Provider
7. IF LED lights or other low power light sources are not in place already this process would change out the light to free up excess power.

The objectives of the invention and other objectives can be obtained by a cellular telephone (cell) and/or internet device configured for providing wireless cell and/or internet service to a city comprising:
a cabinet;
a connection configured to connect to a city device powered by city power;

a cell tower and/or internet wireless transmitter/receiver; and a battery storage, wherein the device is configured to provide a city with wireless cell and/or internet access, the device is configured to charge the battery storage when the city device is not powered by the city power, the device is configured to be powered by the battery when the city device is powered by the city power, and the device is configured to be powered by the city power when the city device is not powered.

The objectives and other objectives can be obtained by a method of providing wireless cell and/or internet service to a city comprising:

providing a plurality of wireless devices, the plurality of wireless devices each comprising:
a cabinet;
a connection configured to connect to a city device powered by city power;
a cell tower and/or internet wireless transmitter/receiver; and
a battery storage, wherein the wireless device is configured to provide a city with wireless cell and/or internet access, each wireless device being connected to an associated city device powered by city power;
charging the battery storage when the city device is not powered by the city power;
powering the wireless device by the battery when the city device is powered by the city power to provide wireless cell and/or internet from the wireless device to user interface devices connected to wireless device; and
powering the wireless device by the city power when the city device is not powered to provide wireless cell and/or internet from the wireless device to user interface devices connected to the wireless device.

The objectives and other objectives can be obtained by a method of providing wireless cell and/or internet service to a city comprising:

providing a plurality of wireless devices, the plurality of wireless devices each comprising:
a cabinet;
a connection configured to connect to a city device powered by city power; and
a cell tower and/or internet wireless transmitter/receiver;
each wireless device being connected to an associated city device comprising at least one light source and being powered by city power, the city device having excess power by replacement of a light source having a lower power than the city device was constructed for, and the wireless devices being powered by the excess power.

The objectives and other objectives can further be obtained by a system of providing wireless cell and/or internet service to a city comprising:

a plurality of the cell and/or internet devices, each device being connected to an associated city device and connected to the internet or telephone network;
a server in communication with the plurality of cell and/or internet devices; and
a plurality of user interface devices in wireless communication with plurality of cell and/or internet devices.

DETAILED DESCRIPTION OF THE INVENTION

In the following description, for purposes of explanation and not limitation, specific details are set forth, such as particular networks, communication systems, computers, terminals, devices, components, techniques, storage devices, data and network protocols, software products and systems, operating systems, development interfaces, hardware, city devices, etc. in order to provide a thorough understanding of the present invention. However, it will be apparent to one skilled in the art that the present invention may be practiced in other embodiments that depart from these specific details. Detailed descriptions of well-known networks, computers, digital devices, storage devices, components, techniques, data and network protocols, software products and systems, development interfaces, operating systems, hardware, city devices and city power are omitted so as not to obscure the description of the present invention.

The invention will now be explained with reference to the attached non-limiting Figs. The operations described in Figs. and herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

FIGS. 1A-4 illustrate examples of a cell and/or internet system 100. The system 100 comprises a server 150 and a plurality of user interface devices 120. The user interface devices 120 and the 150 are connected via a communication network 140 and/or cell network 142. The communication network 140 can be the internet. All connections between the user interface devices 120 and server 150 can be direct, indirect, wireless and/or wired as desired. The user interface devices 120 can also connect to each other as well as any other devices connected to the internet and/or telephone networks.

Figure 1A:
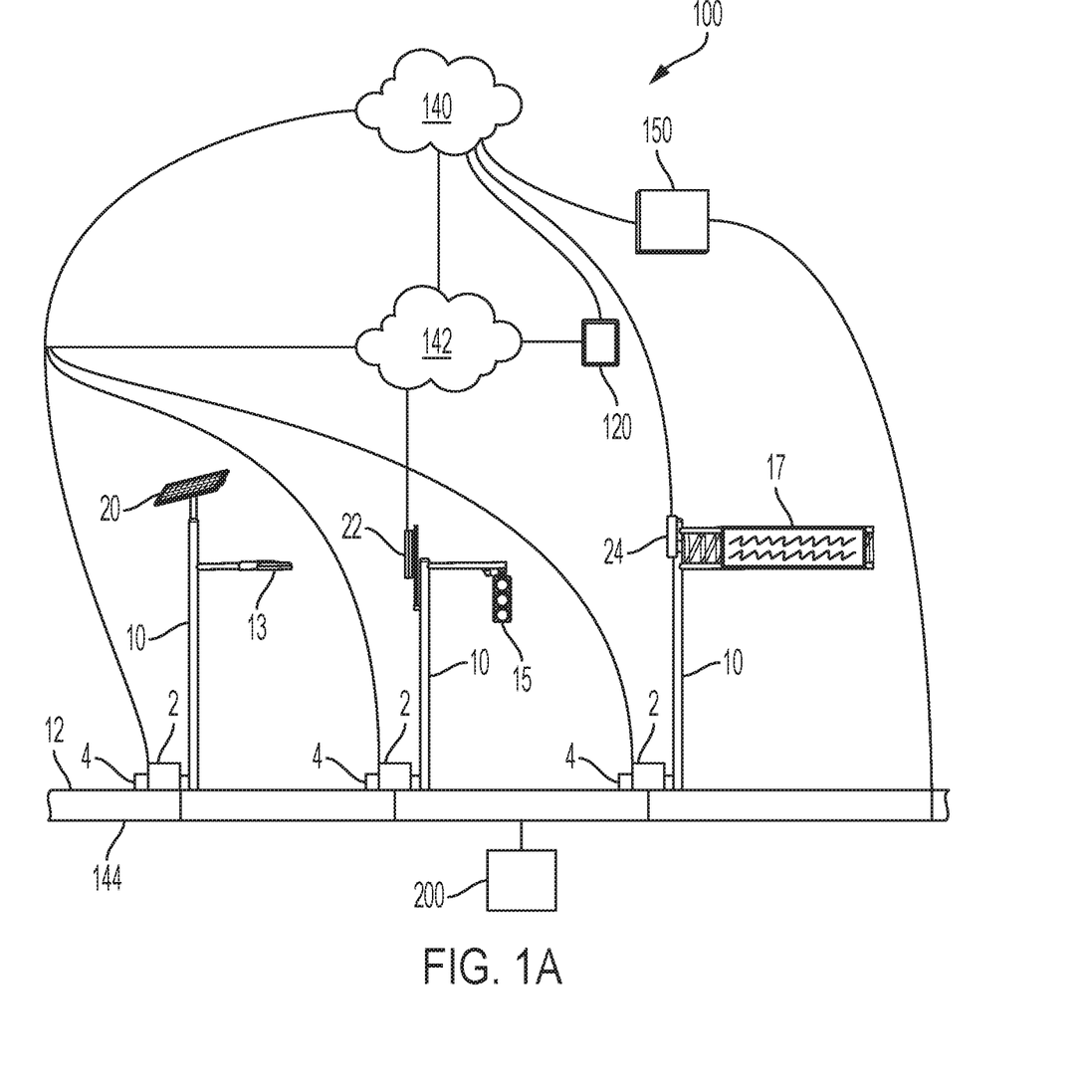
FIG. 1A illustrates a cell and/or internet system.

Various networks 140 may be implemented in accordance with embodiments of the invention, including a wired or wireless local area network (LAN) and a wide area network (WAN), wireless personal area network (PAN) and other types of networks that comprise or are connected to the Internet. When used in a LAN networking environment, computers may be connected to the LAN through a network interface or adapter. When used in a WAN networking environment, computers typically include a modem, router, switch, or other communication mechanism. Modems may be internal or external, and may be connected to the system bus via the user-input interface, or other appropriate mechanism. Computers may be connected over the Internet, an Intranet, Extranet, Ethernet, or any other system that provides communications, such as by the network 140. Some suitable communications protocols may include TCP/IP, UDP, OSI, Ethernet, WAP, IEEE 802.11, Bluetooth, Zigbee, IrDa, WebRTC, or any other desired protocol. Furthermore, components of the system may communicate through a combination of wired or wireless paths, including the telephone networks (cellular). A local cellular network 142 is shown provided by the cell and/or internet system 100.

Figure 1B:
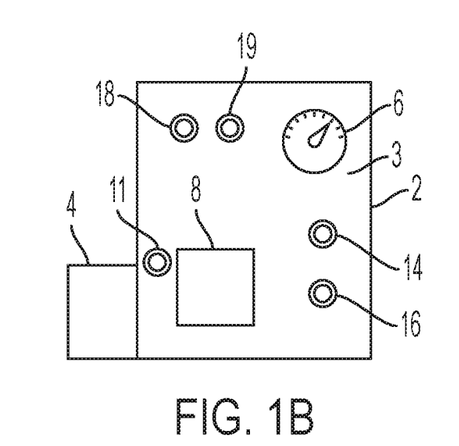
FIG. 1B illustrates a cell and/or internet wireless device.
Figure 1C:
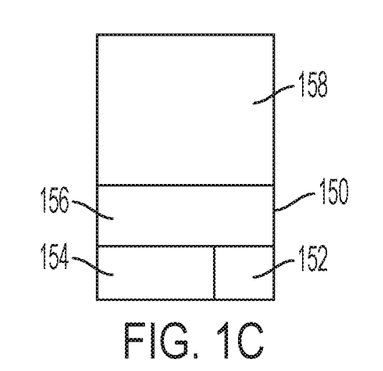
FIG. 1C illustrates a server.
Figure 1D:
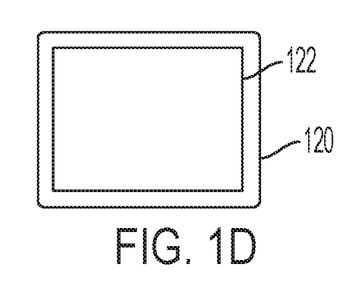
FIG. 1D illustrates a user interface device.

The system 100 can be accessed via any user interface device 120 that is capable of connecting to the network 140 or cell network 142. An exemplary user interface device 120 contains a web browser and display 122. This includes user interface devices 120 such as internet connected televisions and projectors, tablets, iPads, Mac OS computers, Windows computers, e-readers, and mobile user devices such as the smartphones, iPhone, Android, and Windows Phone, and other communication devices. The user interface device can also be a vehicle 25 having the capability of connecting to the network 140. Preferably, the user interface device 120 is a tablet or smartphone. The smartphone can be in any form, such as a hand held device, wristband, or part of another device, such as a vehicle. The user interface devices 120 can connect to internet and/or wirelessly, such as through the network 140 or cell network 142. The user interface device 120 preferably includes an I/O interface that allows a user to interact with the cell and/or internet system 100. The I/O interface may include any hardware, software, or combination of hardware and software.

The system 100 preferably has a connection capacity so that at least 100 user interface devices 120 can be simultaneously connected to and in communication via the cell network 142 and/or network 140. Preferably the connection capacity is at least 500, more preferably at least 1,000, more preferably at least 5,000, more preferably at least 10,000, and most preferably at least 20,000 user interface devices 120 can be simultaneously.

The computer processing unit (CPU) of the user interface device 120 can be implemented as a conventional microprocessor, application specific integrated circuit (ASIC), digital signal processor (DSP), programmable gate array (PGA), or the like. The CPU executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The memory may include random access memory (RAM), ready-only memory (ROM), programmable memory, flash memory, and the like. The memory, include application programs, OS, application data etc. The exemplary user interface device 120 preferably also includes a network module connected to an antenna to communicate with rest of the system 100.

The sever 150 described herein can include one or more computer systems directly connected to one another and/or connected over the network 140. Each computer system includes a processor 152, non-volatile, non-transitory memory 154, user input and user output mechanisms, a network interface, a database 156 and executable program code (software) 158 comprising computer executable instructions stored in non-transitory tangible memory that executes to control the operation of the server 150. Similarly, the processors functional components formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The server 150 can run any desired operating system, such as Windows, Mac OS X, Solaris or any other server based operating systems. Other embodiments can include different functional components. In addition, the present invention is not limited to a particular environment or server 150 configuration. Preferably, the server 150 is a cloud based computer system. If desired for the particular application, the server 150 or portions of the server 150 can be incorporated within one or more of the other devices of the system 100, including but not limited to a user interface device 120.

The server 150 includes at least one web server and the query processing unit. The web server receives the user query and sends it to the query processing unit. The query processing unit processes the user query and responds back to the user interface device 120 via the web server. The query processing unit fetches data from the database server if additional information is needed for processing the user query. The database 156 can be stored in the non-volatile, non-transitory memory. The term "database" includes a single database and a plurality of separate databases. The server 150 can comprise the non-volatile, non-transitory memory or the server 150 can be in communication with the non-volatile, non-transitory memory storing the database. The database 156 can be stored at different locations.

Software program modules 158 and database 156 stored in the non-volatile memory the server 150 can be arranged in logical collections of related information on a plurality of computer systems having associated non-volatile memories. The software 158 and database 156 can be stored using any data structures known in the art including files, arrays, linked lists, relational database tables and the like. The server 150 is programmed to perform the processes described herein.

The cell and/or internet wireless device 2 (IOT and small cell communications) comprises a cabinet 3 that can be configured to be installed above or below ground. The cabinet 3 can include a controller 8, which can be a computer system having a processor and memory in a same manner as the server 150 described herein. The controller 8 can control operation of the wireless device 2. The cabinet 3 can be formed of any suitable materials, such as metals, plastics and composites. An antenna 7 can be connected to the wireless device 2 for transmitting and receiving the wireless signal.

The wireless device 2 can include a connector 14 for connecting to the city power 12, solar power 20, or other power source. The wireless device 2 can include a wired network 144 (such as optical fiber, cable or ethernet) input/output connector 16 for communicating with a newly installed or existing wired network. The wireless device 2 can include a cell tower connector 14 for connecting to a cell tower 22. The wireless device 2 can include a wireless internet (such as wifi) connector 19 for connecting to a wireless transmitter/receiver 24. The wireless device 2 can connect to the internet and/or telephone network wirelessly and/or by wired connection. The wireless device 2 can also include a power meter 6 for monitoring the amount of power obtained from the city power 12 or other power source.

City devices 10 powered by city power 12 include, but are not limited to, a light source, street lights 13, traffic signals 15, traffic displays 17, stop lights, bridge lights, railroad lights, water lights, traffic signs, and any other city powered device, Preferably, the city device 10 is not powered continuously for 24 hours, so that there is down time during which the city power 12 is not being used, such as street lights 13. An embodiment of the present invention utilizes the down time to power the sell and/or internet wireless device 2. During the time the city device 10 is being powered by city power 12, city power 12 supplied to the cell and/or internet wireless device 2 can be reduced or shut off so that the wireless device 2 can be powered by the battery storage 4 (BESS) or other power source. The battery storage 4 can be contained within the cabinet 3 or connected to the cabinet 3. One battery storage 4 can be connected to multiple cabinets 3. In another embodiment of the invention, the city device 10 having excess power by replacement of a light source having a lower power than the city device was constructed for, and the wireless devices 2 being powered by the excess power. The wireless devices 2 can be powered by a combination of the excess power and/or down time. The wireless device 2 can be connected to the city device 10 using the city device connector 11. The city device 10 can be controlled using the server 150. While the drawings show the wireless device 2 and battery storage 4 at the base of a city street light 13, the wireless device 2 and battery storage 4 can be located wherever desired.

The present invention also relates to a method of providing cell and/or internet to a city, and in some cases allows the city to act as an internet service provider (ISP). The method includes connecting a cell and/or internet wireless device 2 to a city device 10 powered by city power 12; storing city power 12 in a battery storage 4 when the city device 10 is not utilizing the city power 12; powering the cell and/or internet wireless device 2 from the battery storage 4 when the city device 10 is utilizing the city power 12; powering the cell and/or internet wireless device 2 from the city power when the city device 10 is not utilizing the city power 12 and/or by excess power from city device 10; connecting the cell and/or internet wireless device 2 to the internet 140 and/or telephone network 142; connecting user interface devices 120 to the internet 140 and/or telephone network 142; providing cell and/or internet services from the cell and/or internet wireless device 2 to the user interface devices 120; connecting a server 150 to the cell and/or internet wireless device 2; and controlling the cell and/or internet wireless device 2 by the server 150.

Figure 1E:
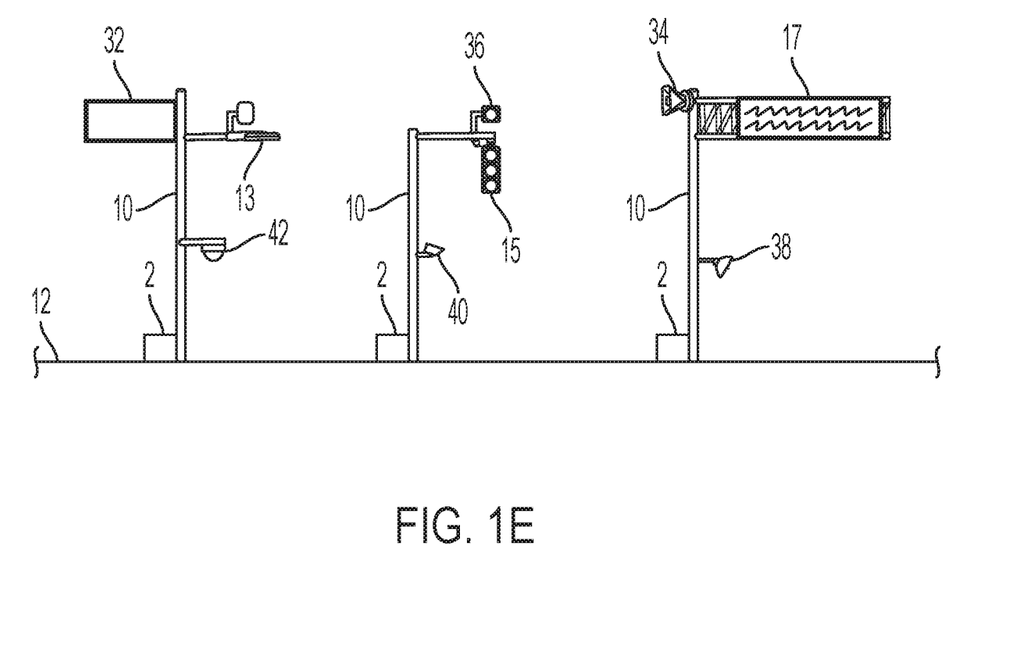
FIG. 1E illustrates optional devices connected to the system.

The battery storage 4 can also be charged by other means. For example, a solar panel 20 and/or a wind generator 21 can also be added to supply power to the battery storage 4 and/or directly to the wireless device 2. A portable generator 23 can be used to charge the battery storage. Vehicles 25 can also be used to charge the battery storage 4. In the event of a city power outage, any these alternative means for charging the battery storage 4 and/or directly powering the wireless device 2 can be utilized. Any of these alternative means for charging the battery storage 4 can also be used to power the city device 10 (traffic signals, street lights, etc.). For example, during a power outage Uber, Lyft, government vehicles, etc. can be used to power the wireless device 2 and/or charge the battery storage 4. The power from the vehicle 25 can be connected to the wireless device 2 and/or battery storage 4 using a cigarette lighter, ac plug, USB cable, or a custom made cable not currently on the market.

The vehicle 25 can be any of a motorcycle, car, van, bus, truck, motorhome or any other vehicle. The vehicle 25 can be powered by electric, gas, diesel or by any other source.

The claimed invention provides numerous unexpected advantages. Instead of having to run an optical fiber to all of the individual businesses and residences, optical fiber can run to the city devices, and wireless internet connections from the city devices to the businesses and residences can be provided.

Example 1

In this example, the city device 10 is a street light 13 in which the city device 10 is powered by the city power 12 at night and during the day the city device 10 is not powered by the city power 12. Demand for cell and internet access from the wireless device 2 is greatest in the daytime, when the wireless device 2 is powered by the city power 12 and the city device 10 is not being powered by the city power 12. Thus, the wireless device 2 provides an efficient use of city power 12, without the need to install additional infrastructure to provide additional city power 12.

Users can connect to the cell 142 and/or internet 140 using the user interface device 120 and log onto the server 150. The user can input their information, such as name, address, billing information, payment information, user interface type, number of users, and any other relevant information that can be stored in the database 156. The server 150 can take payment, send texts, emails and any correspondence. Payment for internet and/or telephone services can be provided.

The wireless device 2 and wired network 144 can be installed using microtrenching, such as in disclosed in my copending U.S. patent application publication Nos. 2018/0106015 (Pino), published 19 Apr. 2018, 20190226603 (Pino), published 25 Jul. 2019, the complete disclosures of which is incorporated herein by reference, to install a cable, optical fiber, ethernet, or any other wired network 144, if not already installed. The wired network 144 can include the internet 140 and/or cell 142.

The system 100 allows the city to be an internet service provider (ISP) and/or cell provider. The operation of the system 100, including customer interaction via user interface devices 120, billing, data usage, voice usage, and all other aspects of ISP and cell providers can be controlled using the server 150.

The system 100 provides a smart city. Warning devices 30, such as displays 32, speakers or sirens 34, colored lights 36, and other warning devices can be connected to the device. The warning device 30 can be used to any desired provide warnings, such as weather (hurricanes, tornadoes, lightning, floods, etc.), active shooter, child abduction, send out general messages, traffic accidents, traffic control, speed limits, dangerous situations. Listening devices 38 can be connected to the wireless device 2 to monitor sounds near the wireless device 2. Video devices 40 can be connected to the wireless device 2 to view and/or record video near the wireless device 2. Motion detectors 42 can be connected to the wireless device 2 to monitor moving objects, such as pedestrians, bicycles, vehicles, etc., moving near the device. Any desired sensor can be connected to the wireless device 2. Everything connected to the wireless device 2 can be controlled using the server 150, or directly connecting the wireless device 2.

Figure 7:
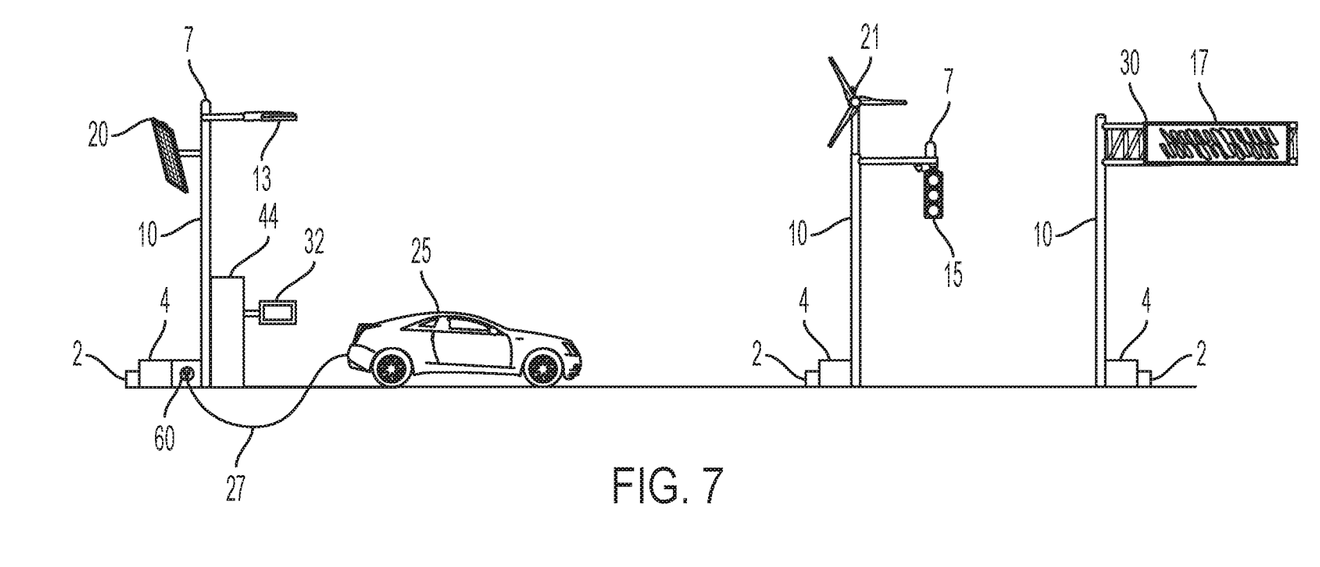
FIG. 7 illustrates a kiosk and car charging port.

The warning devices 30, including the displays 32 can be configured for use in bus stops, kiosks, parking meters, bike rentals, car rentals, charging stations, digital traffic signage, warnings and alerts, emergency response and/or warnings, or any other desired business or other entity in which communication is desired. The display 32 can be touch screen and/or include an input device, such as a keyboard, to provide communication between any of the city, businesses and individuals. The display 32 can located in a kiosk 44.

The listening devices 38 can be configured to detect gun shots. The listening devices 38 can also be configured to provide communication between any of the city, businesses and individuals.

The video devices 40 can be configured to detect traffic violations, such as red light, turning, speed, and accidents. The video devices 40 can also be configured for general surveillance.

Figure 2:
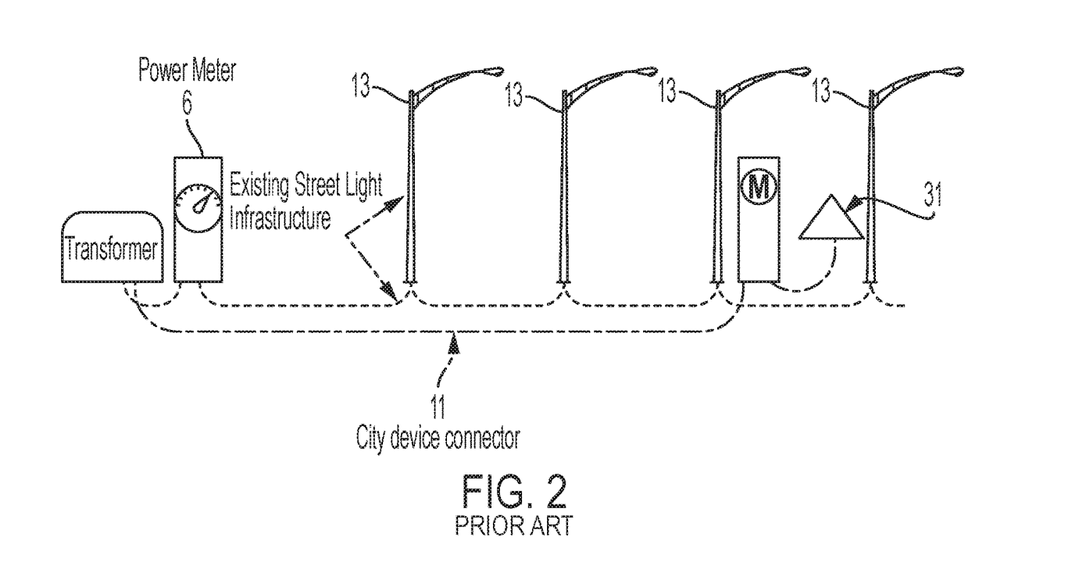
FIG. 2 [Prior Art] illustrates conventional street lighting system.
Figure 3:
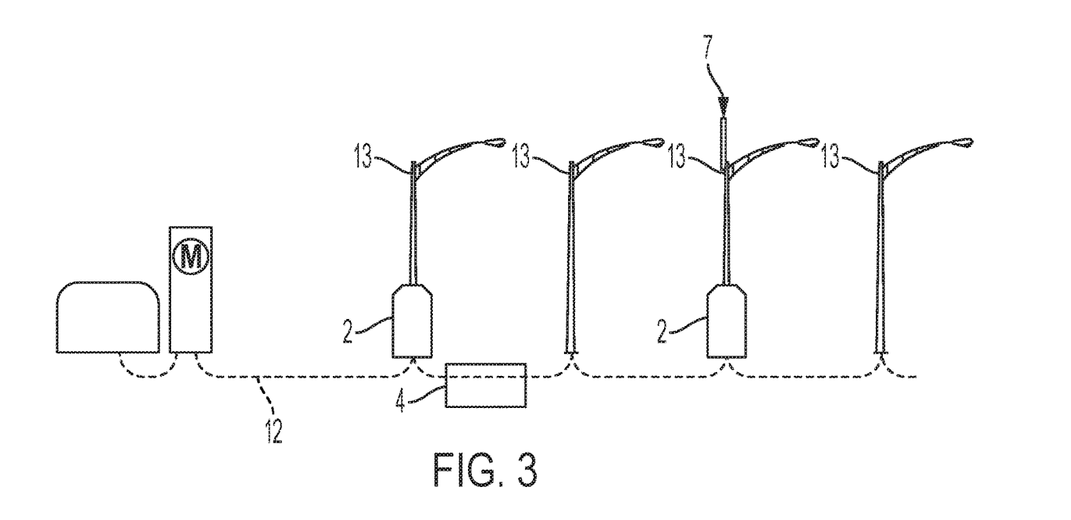
FIG. 3 illustrates a cell and/or internet system installed.
Figure 4:
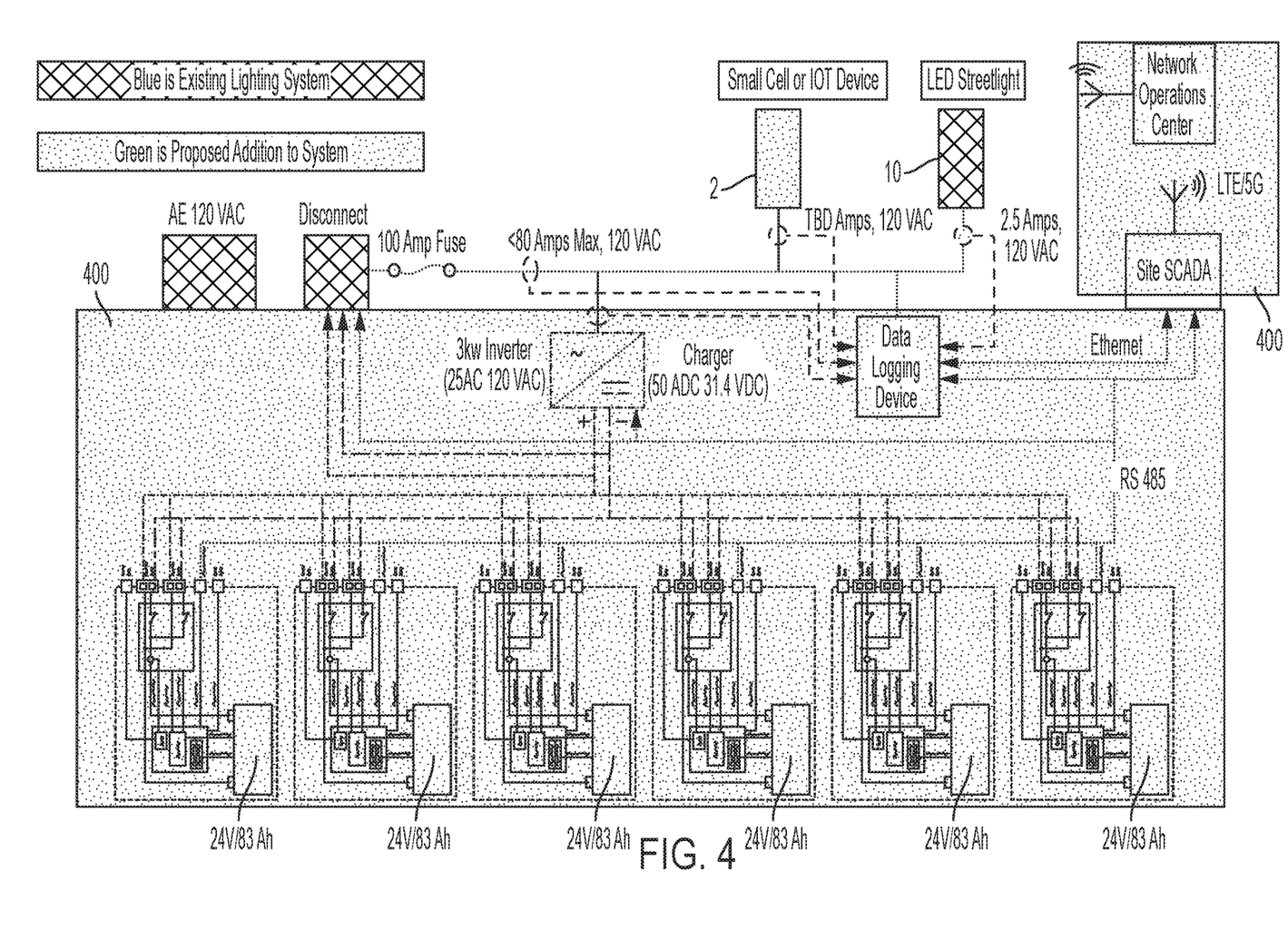
FIG. 4 illustrates a cell and/or internet system installed.

FIG. 2 [Prior Art] shows city devices 10 (street lights) connected to the city power 12 and being metered 11 with a conventional parking meter connection 31. FIG. 3 illustrates the city devices 10 modified to include the present invention having the wireless device 2, battery 4 and antenna 7. FIG. 4 illustrates an exemplary electrical circuit 400 connected to the city power 12 and city device 10.

Figure 5:
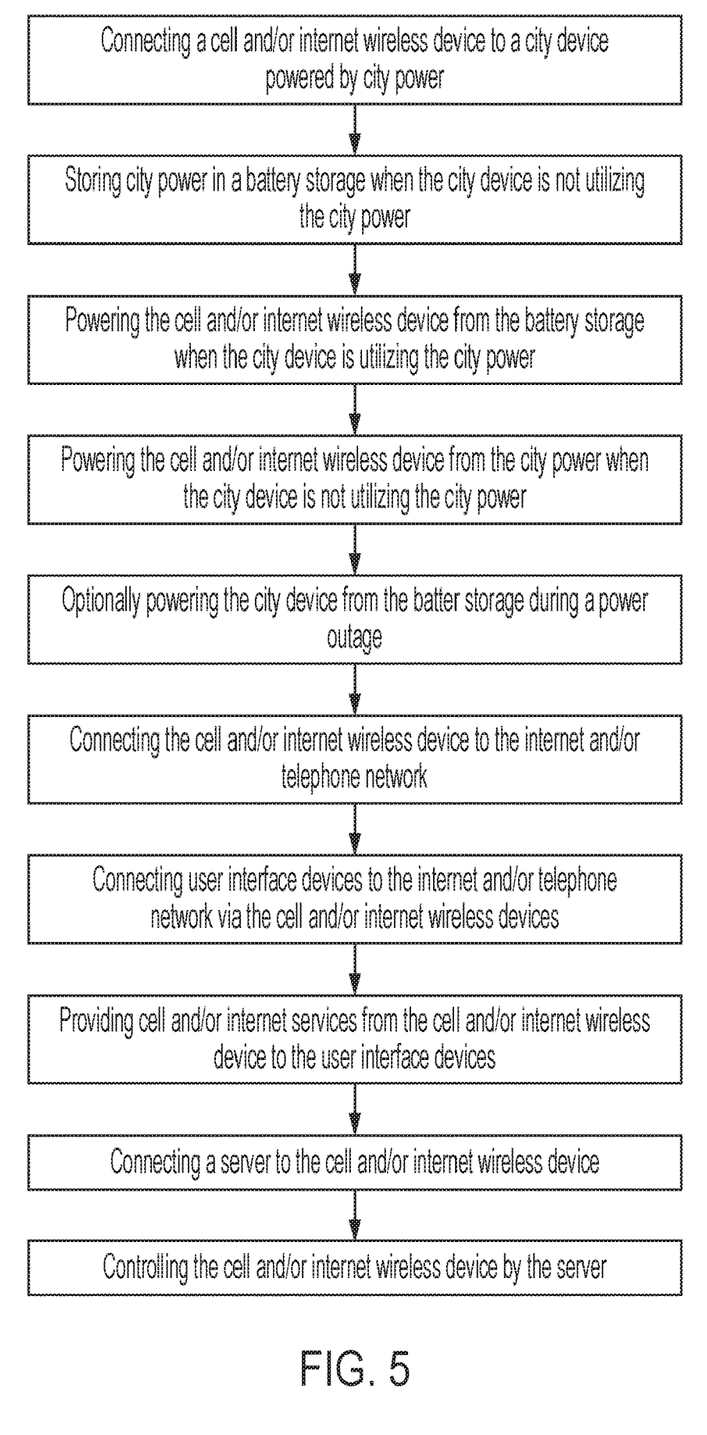
FIG. 5 illustrates a flow chart of a process for providing cell and/or internet services using the cell and/or internet system.

FIG. 5 illustrates a flow chart of an embodiment of the methods described and claimed herein. The cell and/or internet wireless device 2 is connected to the city device 10 so that the cell and/or internet wireless device 2 is powered by the city power 12. City power 12 is stored in the battery storage 4 when the city device 10 is not utilizing the city power 12. The cell and/or internet wireless device 2 can be powered from the battery storage when the city device 10 is utilizing the city power 12. The cell and/or internet wireless device 2 can be powered from the city power 12 when the city device 10 is not utilizing the city power 12. Optionally, the city device 10 can be powered from the battery storage 4 during a power outage. The cell and/or internet wireless device 2 is connected to the internet 140 and/or telephone network 142. User interface devices 120 can be connected to the internet 140 and/or telephone network 142 via the cell and/or internet wireless devices 2. Cell and/or internet services from the cell and/or internet wireless devices 2 can be provided to the user interface devices 120. A server 150 can be connected to the cell and/or internet wireless device 2 for controlling the cell and/or internet wireless device 2.

Figure 6:
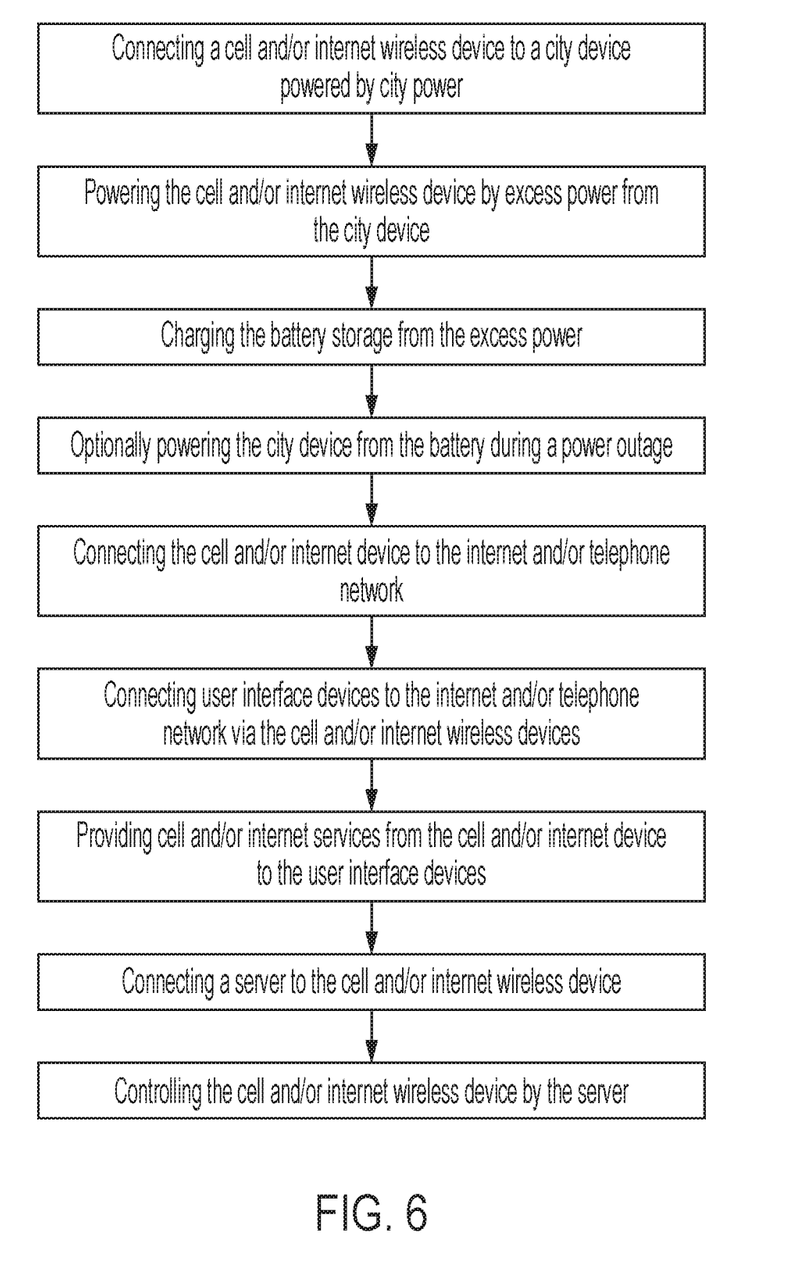
FIG. 6 illustrates a flow chart of a process for providing cell and/or internet services using the cell and/or internet system.

FIG. 6 illustrates a flow chart of an embodiment of the methods described and claimed herein. The cell and/or internet wireless device 2 is connected to the city device 10 so that the cell and/or internet wireless device 2 is powered by the city power 12. The cell and/or internet wireless device 2 is powered by excess power from the city device 10. The battery storage 4 is powered by the excess power.

Optionally, the city device 10 can be powered from the battery storage 4 during a power outage. The cell and/or internet wireless device 2 is connected to the internet 140 and/or telephone network 142. User interface devices 120 can be connected to the internet 140 and/or telephone network 142 via the cell and/or internet wireless devices 2. Cell and/or internet services from the cell and/or internet wireless devices 2 can be provided to the user interface devices 120. A server 150 can be connected to the cell and/or internet wireless device 2 for controlling the cell and/or internet wireless device 2.

Using the present invention, the city can now become its own internet service provider (ISP). Multiple connections to homes and businesses can be provided using the present invention so that users can select between different ISP's. In this manner, cities are no longer subject to the predatory pricing of a single monopolistic ISP. The owner of the present invention can retain ownership and rent the present invention to cities.

The present invention can be used to easily provide private networks, such as for, emergency management, law enforcement, homeland security, hospitals, train stations, bus stations, airports, or any other desired private network.

The present invention numerous advantages, including:
a. Utilize existing second infrastructure.
b. Preserve public safety and welfare, including traffic, pedestrian and accessibility requirements.
c. Minimize disruption from construction and installation work in city row.
d. Continue implementation of Austin's great streets initiative to reduce physical and visual clutter on city streets and sidewalks.
e. Provide access and safety for systems repairs and maintenance.
f. Include flexibility to anticipate changing technology for continued innovation.
g. No above ground electric distribution or other wires.

The wireless device 2 can comprises a Small Cell facility, which includes low-powered antennas 7 that can provide cellular (cell tower 22) and data coverage (wireless transmitter/receiver 24) to smaller geographic areas, supplementing the larger cellular network and improving service for wireless customers.

My previously patent applications relating to installing wired networks, including U.S. Pat. No. 9,485,468 and U.S. patent application Ser. No. 16/371,675, are incorporated herein by reference in their entirety. A wired user 200 can be directly connected to the wired network 144. Examples of wired users 200 include, residences, businesses, governments, and any other.

The present invention can also provide an electric vehicle 25 charging station 60 connected to the wireless device 2 and battery storage 4. An electric vehicle 25 could pull up to the wireless device 2 and the driver can connect to the system server 150 using a user interface device 120 using an app or can use a kiosk 44 having a display 32 to enter a credit card to pay for the electricity used to charge the vehicle 25. The vehicle 25 can connect to the battery storage 4 and charging station 60 using an electric charge port 27. This would generate additional revenue for the city.

The following terms are used in reference to the FIGS.
2 Cell and/or internet device
3 Cabinet
4 Battery storage
6 Power meter
7 Antenna
8 Controller
10 City device powered by city power
11 City device connector
12 City power
13 Street light
14 Power connector
15 Stop light
16 Optical fiber/cable/wired network, input/output
17 Traffic display
18 Cell tower connection
19 Wireless internet/wifi connector
20 Solar power
21 Wind generator
22 Cell tower
23 Portable generator
24 Wireless internet/wifi transmitter/receiver
25 Vehicle 27 Electric charge port
30 Warning devices
31 Conventional wireless parking meter
32 Display
34 Speaker/siren
36 Colored lights
38 Listening devices
40 Video recorder
42 Motion detector
44 Kiosk
60 Electric vehicle charging station
100 Cell and/or internet system
120 User interface device
122 Display
140 Internet/Network
142 Telephone network
144 Optical fiber/Cable/ethernet/wired network
150 Server
152 Processor
154 Non-volatile, non-transitory memory
156 Database
158 Computer executable instructions
200 Wired user
400 Exemplary circuit It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method of providing wireless cell and/or internet service to a city comprising:
   providing a plurality of wireless devices, the plurality of wireless devices each comprising:
   a cabinet;
   a connection configured to connect to a city device powered by city power;
   a cell tower and/or internet wireless transmitter/receiver; and
   a battery storage, wherein the wireless device is configured to provide a city with wireless cell and/or internet access, each wireless device being connected to an associated city device powered by city power;
   charging the battery storage when the city device is not powered by the city power;
   powering the wireless device by the battery when the city device is powered by the city power to provide wireless cell and/or internet from the wireless device to user interface devices connected to wireless device; and
   powering the wireless device by the city power when the city device is not powered to provide wireless cell and/or internet from the wireless device to user interface devices connected to the wireless device.

2. The method according to claim 1, wherein the city device comprises a light source.

3. The method according to claim 2, wherein the light source comprises at least one of a street light, traffic signal, traffic sign, stop light, bridge light, railroad light, and water light.

4. The method according to claim 2, further comprising powering the city device by the battery storage during a power outage.

5. The method according to claim 1, wherein the city device comprises a parking meter.

6. The method according to claim 1, further comprising providing a wired network and connecting the wireless devices to the wired network.

7. The method according to claim 1, further comprising providing wireless telephone service through the wireless devices.

8. The method according to claim 1, further comprising providing wireless internet service through the wireless devices.

9. The method according to claim 1, further comprising a video device connected to the wireless device and the capturing video by the video device.

10. The method according to claim 9, further comprising capturing video to determine a traffic violation.

11. The method according to claim 1, further comprising a warning device connected to the wireless device and further comprising providing a warning by the warning device.

12. The method according to claim 11, wherein the warning device comprises at least one of a speaker, a siren, and a colored light.

13. The method according to claim 1, further comprising a listening device connected to the wireless device and further comprising recording a sound by the listening device.

14. The method according to claim 1, further comprising a motion device connected to the wireless device and further comprising detection motion by the motion device.

15. The method according to claim 1, further comprising a display connected to the wireless device and further comprising displaying information by the display.

16. The method according to claim 1, further comprising a server in communication with the wireless devices.

17. The method according to claim 1, wherein the wireless devices provide a private network.

18. The method according to claim 1, wherein the wireless device further comprises an electric charge port and further comprising charging an electric vehicle from the battery storage by connecting the electric vehicle to the electric charge port.

19. The method according to claim 1, further comprising connecting a vehicle to the wireless device and at least one of charging the battery, powering the wireless device or powering the city device by the vehicle.

* * * * *